Patented Feb. 22, 1949

UNITED STATES PATENT OFFICE 2,462,163

MANUFACTURE OF ESTERS

Frank O. Cockerille, Albemarle County, Va., assignor to E. I. du Pont de Nemours & Company, Wilmington, Del., a corporation of Delaware No Drawing. Application September 24, 1943, Serial No. 503,655

2 Claims. (Cl. 260—498)

This invention relates to the manufacture of vinyl and ethylidene esters by reacting acetylene with a carboxylic acid, and more particularly this invention is concerned with improving the efficiency of these reactions and the proportion of vinyl ester in the reaction mixture.

When one mol of acetylene is interacted with one mol of acetic acid under suitable catalytic conditions, one mol of vinyl acetate is formed but, in the presence of a large excess of acetic acid, a good deal of the vinyl acetate is at once converted into ethylidene diacetate. These reactions take place simultaneously and are governed by the composition of the acetic acid liquor through which the acetylene is passed and especially by the amount and type of catalyst, by the temperature, purity of the acetylene, etc.

In order to prevent the vinyl acetate from being largely converted into ethylidene diacetate, it is necessary to remove it from the zone of reaction as it is formed. A convenient way of doing this is to sweep out of the reaction vessel the reaction vapours with an excess of acetylene, cooling to condense and remove the vinyl acetate therefrom, and then reintroducing the acetylene gas freed from vinyl acetate into the reaction zone. (See U. S. Patent No. 1,638,713.) Obviously, if the reaction between vinyl acetate and acetic acid to form ethylidene diacetate could be suppressed, the vinyl acetate produced stabilized against further reaction or the formation of vinyl acetate promoted, the vapors or "heads" removed from the zone of reaction would be still richer in vinyl acetate.

Moreover, under the most favorable conditions of operation, a certain amount of undesirable side reactions take place, chiefly to form high boiling, polymeric compounds collectively termed "tars." Tar formation consumes acetic acid values which otherwise would result in useful products and, therefore, should be reduced to a minimum.

This invention, therefore, has as its principal object the provision of an improved process for reacting acetylene with a carboxylic acid to form vinyl and ethylidene esters. Another object of this invention is to influence the absorption reaction of acetylene and acetic acid in favor of an increase in the proportionate yield of vinyl esters. A further object is to effect the absorption interaction of acetylene and carboxylic acid with a minimum formation of tar. Other objects of the invention will be apparent from the description that follows.

These objects are realized by my invention which, briefly stated, comprises adding to the absorber liquor commonly used in the manufacture of vinyl and ethylidene esters a small amount of a compound having the general formula

where X denotes a member of the group consisting of nitrogen, phosphorus and arsenic, where R stands for an aromatic radical, and where R' and R'' may be the same or different aliphatic hydrocarbon radicals such as methyl, ethyl, propyl, etc.

A few of the many compounds which are useful in accordance with this invention are: dimethyl aniline, diethyl aniline, dipropyl aniline, methyl ethyl aniline, dimethyl naphthylamine, diethyl naphthylamine, dimethyl phenyl phosphine, diethyl phenyl phosphine, dimethyl phenyl arsine, diethyl phenyl arsine, methyl ethyl phenyl arsine, p - chlorodimethyl aniline, p - dimethylamino acetophenone, o-dimethylaminobenzoic acid, m-nitrodiphenyl aniline, diethyl-o-toluidine, diethyl-α-naphthylamine, p-bromophenyl dimethyl arsine, dimethyl sulfanilic acid, and tetramethyl diaminodiphenyl methane.

Only a very small amount of any one of the compounds useful for the purposes of my invention need be used to give a marked improvement in the reaction. The preferred range of concentration is between about 0.001 and about 0.01 gram mol per liter of the absorber liquor.

The following examples are given to further illustrate my invention. In all these examples a static system is used to illustrate the principle of forcing the reaction toward a greater proportionate yield of vinyl ester at the expense of ethylidene diester. However, when this invention is used in a circulatory system such as previously mentioned, proportionate increases in vinyl ester yield will likewise be obtained. Parts and percentage compositions are by weight unless otherwise indicated.

Example I

A reaction vessel equipped with an efficient agitator and a reflux condenser was charged with 498 parts of glacial acetic acid (M. P. 16.4° C.), 21.5 parts of 95% acetic anhydride, 5 parts of crystalline mercury sulfate, 0.25 part (0.004 mol per liter) dimethyl aniline, and 1.0 part (0.007 mol per liter) crystalline methanetrisulfonic acid trihydrate. The temperature of the mixed ingredients was raised to 85° C. (±5°) while a slow stream of dried acetylene was passed over the surface to flush out inert gases. The agitator was started and acetylene passed in as needed to maintain a pressure of about one pound per square inch in excess of atmospheric, the rate of acetylene consumption being read from a flow meter at frequent intervals, After an induction period, during which little absorption occurred, the rate increased rapidly, reaching a peak 15 minutes after agitation was started. The temperature was held between 90° and 95° C. during the absorption. The rate decreased gradually and the absorption was stopped about one hour after the highest rate was attained. It was found that the product consisted, after neutralization with sodium acetate and filtration to remove insoluble sludge and mercury compounds, of about 70% ethylidene diacetate, about 12% vinyl acetate, 1% acetic anhydride, 0.6% non-volatile residue, and the remainder acetic acid.

A control run, from which the dimethyl aniline was omitted, yielded a product containing about 75% ethylidene diacetate, about 4% vinyl acetate, 1% acetic anhydride and 1.25% non-volatile residue.

Example II

A charge like that in Example I was prepared, except that the mercury sulfate was omitted and only 445 parts of acetic acid was used. After the temperature had reached 80° C. (±5°), the agitator was started and a solution containing 5% of mercuric acetate in glacial acetic acid was added, starting with 3 parts and continuing at intervals of several minutes with portions of 1 to 2 parts, as required to maintain a satisfactory rate of absorption. A total of 50 parts of the mercuric acetate solution was used. In general, the characteristics of the absorption reaction were similar to those observed when the mercury was used in the form of sulfate. The yields of both ethylidene diacetate and vinyl acetate were higher than in Example I, being about 75% and about 15% of the final mixture, respectively. Only 0.6% anhydride was found and the non-volatile residue was 0.4%.

A control charge with mercuric acetate catalyst which contained about 82% ethylidene diacetate, about 6% vinyl acetate, 0.6% anhydride and 1.0% non-volatile residue was made.

Example III

Charge and procedure like Example I, except that only 0.125 part (0.002 mol per liter) dimethyl aniline was used. The product contained about 70% ethylidene diacetate, about 8% vinyl acetate, 1% anhydride and 0.7% non-volatile residue.

Example IV

Charge and procedure like Example II, except that only 0.125 part (0.002 mol per liter) dimethyl aniline was used. The product contained about 78% ethylidene diacetate, about 10% vinyl acetate, 0.6% anhydride, and 0.6% non-volatile residue.

Example V

Charge and procedure like Example II, except that the dimethyl aniline (0.25 part) was dissolved in the mercuric acetate solution and thereby added gradually during the absorption. The product contained about 77% ethylidene diacetate, about 14% vinyl acetate, 0.6% anhydride, and 0.5% non-volatile residue.

It is to be understood, of course, that the above examples are merely for purposes of illustration and this invention is not restricted to the exact conditions and the specific agent, dimethyl aniline, disclosed in the examples, but is susceptible to wide variations which will be immediately obvious to persons skilled in the art, and the use of any agent falling under the type formula

defined hereinabove. Although the invention has been described with specific reference to the manufacture of vinyl acetate and ethylidene diacetate, it is also applicable to the formation of other vinyl and ethylidene esters, such as vinyl propionate, vinyl butyrate, ethylidene dipropionate, ethylidene dibutyrate, etc.

When a compound of the formula

e. g. dimethyl aniline, is employed under the principle of "heads" removal, there is a distinct gain in yield of vinyl acetate. Not only is the percentage of vinyl acetate in the "heads" increased from the normal average figure of about 35% to an average of about 65%, but there is also a 25% to 50% increase in the amount of "heads" removed. This is due to the fact that the overall vapor pressure of the system is increased because of the increased percentage of vinyl acetate in the reaction liquor. It will be seen that this dual increase in amount and quality of heads removed leads to more than twice the normal yield of vinyl acetate per unit of time.

A further gain in rate of removal of vinyl acetate may be obtained by raising the temperature of the reaction liquor. This is not permissible in the absence of dimethyl aniline or the like because there is too great an attendant increase in the rate of conversion of vinyl acetate to ethylidene diacetate. A 10° C. increase in temperature leads to a very substantial increase in the vapor pressures of both vinyl acetate and acetic acid, with the consequence that more heads are removed. Commonly, using dimethyl aniline together with a higher reaction temperature, the yield of vinyl acetate in the same time cycle is increased three- to four-fold.

I claim:

1. In the manufacture of vinyl and ethylidene esters, wherein acetylene is reacted with a carboxylic acid whereby to form said esters, the improvement which comprises reacting the acetylene and the carboxylic acid in the presence of about 0.001 to about 0.01 gram mol of dimethyl aniline per liter of reaction mixture.

2. In the manufacture of vinyl acetate wherein acetylene is reacted with acetic acid to form said vinyl acetate, the improvement which comprises reacting the acetylene and acetic acid in the presence of from about 0.001 to about 0.01 gram mol of dimethyl aniline per liter of reaction mixture.

FRANK O. COCKERILLE.

REFERENCES CITED

The following references are of record in the file of this patent:

UNITED STATES PATENTS

| Number | Name | Date |
|---|---|---|
| 2,011,011 | Rabald | Aug. 13, 1935 |
| 2,217,735 | Dreyfus | Oct. 15, 1940 |
| 2,227,819 | Berg et al. | Jan. 7, 1941 |
| 2,339,126 | Wolfram et al. | Jan. 11, 1944 |

OTHER REFERENCES

Karrer, Organic Chemistry, Trans. by Mee, 1938, Nordeman Pub. Co., pages 112 to 118, 125 to 128, 412 to 418, 458 to 461.